(12) United States Patent
Yoshikawa

(10) Patent No.: US 7,179,439 B2
(45) Date of Patent: Feb. 20, 2007

(54) METHOD FOR PREPARING DISODIUM PARAPERIODATE

(75) Inventor: Kouji Yoshikawa, Toyonaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 10/549,598

(22) PCT Filed: Mar. 19, 2003

(86) PCT No.: PCT/JP04/03491

§ 371 (c)(1),
(2), (4) Date: Sep. 19, 2005

(87) PCT Pub. No.: WO2004/083117

PCT Pub. Date: Sep. 30, 2004

(65) Prior Publication Data

US 2006/0228291 A1    Oct. 12, 2006

(30) Foreign Application Priority Data

Mar. 19, 2003   (JP) .............................. 2003-075248

(51) Int. Cl.
*C01B 11/22*   (2006.01)

(52) U.S. Cl. ........................ 423/476; 423/462; 423/184
(58) Field of Classification Search ................ 423/462, 423/476, 184
See application file for complete search history.

(56) References Cited

U.S. PATENT DOCUMENTS

| 4,134,967 A | * | 1/1979 | Hillis et al. ................. 423/462 |
| 4,176,167 A | | 11/1979 | Jernigan et al. |
| 4,405,573 A | * | 9/1983 | Deininger et al. ........ 423/150.1 |
| 6,017,506 A | * | 1/2000 | Dijt et al. ................... 423/476 |
| 2002/0072599 A1 | * | 6/2002 | Besemer ...................... 536/56 |

FOREIGN PATENT DOCUMENTS

| JP | 04-202001 A | 7/1992 |
| JP | 11-263602 A | 9/1999 |

* cited by examiner

*Primary Examiner*—Ngoc-Yen Nguyen
(74) *Attorney, Agent, or Firm*—Sughrue Mion, PLLC

(57) ABSTRACT

It is provided that a method for preparing disodium paraperiodate, characterized in that a pH of a reaction mixture which is obtained by reacting sodium iodate, iodic acid or a mixture thereof with sodium hypochlorite using sodium hydroxide is adjusted to the range between 5 and 10.

10 Claims, No Drawings

METHOD FOR PREPARING DISODIUM PARAPERIODATE

TECHNICAL FIELD

The present invention relates to a method for preparing disodium paraperiodate.

BACKGROUND ART

Although sodium metaperiodate ($NaIO_4$) and periodic acid ($HIO_4$) were useful oxidizing agents for oxidizing various organic compounds, they are comparatively expensive. Therefore, it was known a method for reusing them by oxidizing by-product, sodium iodate ($NaIO_3$) or iodic acid ($HIO_3$), obtained in the oxidation reaction using them to disodium paraperiodate ($Na_2H_3IO_6$) using chlorine gas, isolating to collect it by filtration, and converting it into disodium metaperiodate (JP-B-2912444 etc.).

DISCLOSURE OF THE INVENTION

According to the present invention, since a highly toxic chlorine gas is not used, the specifically equipment is not needed and disodium paraperiodate can be prepared advantageously on the occupational safety and health at more convenient equipment.

That is, the present invention provides a method for preparing disodium paraperiodate characterized in that a pH of a reaction mixture which is obtained by reacting sodium iodate, iodic acid or a mixture thereof with sodium hypochlorite using sodium hydroxide is adjusted to the range between 5 and 10 (hereinafter referred to as the present method).

BEST MODE FOR CARRYING OUT THE INVENTION

In the present method sodium iodate and iodic acid may be used alone or in the form of a mixture. When a mixture thereof is used, a sodium iodate/iodic acid ratio in the mixture is not particularly limited. A commercially available sodium iodate and iodic acid may be used. Sodium iodate obtained by oxidizing iodine compounds at lower oxidation state such as iodine in an aqueous sodium hypochlorite, according to a known method disclosed in, for example, Inorganic Synthesis Collective Vol. I, p. 168, or reducing iodine compounds at higher oxidation state may be used.

Sodium iodate, iodic acid or a mixture thereof obtained in the oxidation reaction of reacting organic compounds with sodium metaperiodate or periodic acid as oxidizing agents, whose representative examples are a method for the oxidative cleavage of carbon-carbon double bond of olefins by reacting with sodium metaperiodate or periodic acid in the presence of a ruthenium catalyst and a method for the oxidative cleavage of carbon-carbon bond of diols by reacting with sodium metaperiodate or periodic acid, may be used. Above-mentioned by-product sodium iodate, iodic acid or a mixture thereof is usually contained in a waste water discharged from the reaction step. For the present invention the above-mentioned waste water may be used as it is, or by-product sodium iodate or iodic acid isolated from the above-mentioned waste water may be used.

The above-mentioned waste water may include inorganic compounds such as sodium nitrate, sodium carbonate, sodium hydrogen carbonate, sodium sulfate, sodium hydrogen sulfate, sodium sulfite, sodium hydrogen sulfite, sodium chloride, sodium bromide, sodium iodide, and iodine, and/or catalysts including ruthenium catalyst or the like, beside the by-product sodium iodate or iodic acid.

Sodium hypochlorite is usually used as a solution in water, and the amount used of it is usually 1 to 3 mols, preferably 1 to 1.2 mols per 1 mol of iodide ion in sodium iodate, iodic acid or a mixture thereof.

Sodium hydroxide is usually used as a solution in water. When sodium iodate is used alone, the amount used of sodium hydroxide is usually 0.5 mol or more, preferably 0.8 mol or more, more preferably 1 mol or more per 1 mol of sodium iodate. When iodic acid is used alone, the amount used of sodium hydroxide is usually 1.5 mol or more, preferably 1.8 mol or more, more preferably 2 mol or more per 1 mol of iodic acid. Sodium hydroxide may be used after neutralizing iodic acid by using sodium hydroxide, sodium carbonate, sodium hydrogen carbonate etc. to form sodium iodate. When a mixture of sodium iodate and iodic acid is used, the amount used of sodium hydroxide is determined suitably on the basis of the above-mentioned amount ratio according to content of sodium iodate and iodic acid in the mixture, or the amount used of sodium hydroxide may be suitable to the amount of sodium iodate obtained by neutralizing a mixture of sodium iodate and iodic acid as the above.

The reaction of sodium iodate, iodic acid, or a mixture thereof and sodium hypochlorite is usually performed in a water. The amount used of water is usually 2 to 10 parts by weight per 1 part by weight of sodium iodate, iodic acid or a mixture thereof. When a waste water containing by-product sodium iodate or iodic acid, which is discharged from the reaction step in the oxidation reaction of organic compounds, is used, water may be added thereto separately, or the above-mentioned waste water as it is, sodium hypochlorite and sodium hydroxide may be contacted and mixed.

In the present method, the amount used of sodium hydroxide and sodium hypochlorite are decided suitably like the above. The embodiment includes, for example, adding sodium hypochlorite and sodium hydroxide to sodium iodate, iodic acid or a mixture thereof at the same time, adding the mixture of hypochlorite and sodium hydroxide to sodium iodate, iodic acid or a mixture thereof and adding sodium iodate, iodic acid or a mixture thereof to the mixture of hypochlorite and sodium hydroxide. The method for mixing them is not particularly limited in them. The reaction temperature is usually 50 to 100° C. The reaction time varies depending on the reaction temperature and it is usually 2 to 10 hours.

More detail, for example, preferable amount used of sodium hydroxide to adjust the pH of the reaction mixture to the preferable range between 5 and 10 is 0.8 mol or more per 1 mol of sodium iodate, and 1.8 mols or more per 1 mol of iodic acid, more preferable is 1 mol or more per 1 mol of sodium iodate, and 2 mols or more per 1 mol of iodic acid. There is no upper limit of the amount used of sodium hydroxide and it is usually 3 mols or less per 1 mol of sodium iodate, iodic acid or the sum of them.

In addition to the above-mentioned embodiments, the present method also includes, for example, the embodiment which is to adjust the pH of the reaction mixture to the range between 5 and 10, preferably 5 and less than 7 by adding sodium hydroxide suitably, bases such as sodium carbonate, or acids such as hydrochloride, sulfuric acid, and nitric acid, to the reaction mixture in consideration of the amount of sodium hydroxide.

The present method also includes the embodiment which is that sodium hypochlorite was reacted with sodium iodate, iodic acid or a mixture thereof in the presence of sodium hydroxide, and then the pH of the obtained reaction mixture is adjusted preferably to the range between 5 and less than 7, for example, by using the above-mentioned acids.

The thus obtained slurry containing disodium paraperiodate crystals can be used as it is to the next step. The crystals can be collected by decantation, filtration and the like.

The temperature of filtration and the like is usually 50° C. or less, preferably 30° C. or less.

The thus obtained disodium paraperiodate can be converted easily into sodium metaperiodate after isolating by filtration or as the slurry in some cases, followed by contacting with an acid such as nitric acid and sulfuric acid, and adjusting the pH of the obtained water solution to the range between 2 and 2.5, and the obtained sodium metaperiodate can be also isolated at good yield by filtration.

INDUSTRIAL APPLICABILITY

According to the present invention, disodium paraperiodate can be prepared industrially and advantageously from sodium iodate, iodic acid or a mixture thereof.

EXAMPLES

The present invention is illustrated below in more detail with examples, but the present invention is not limited by these examples.

The content of sodium (Na) and iodine (I) were analyzed by the each method for water(dilute nitric acid) soluble-ion chromatography and flask combustion-ion chromatography.

Example 1

After adding 804.8 g of water to 200.5 g of sodium iodate, 146.1 g of 30 wt % aqueous sodium hydroxide and 648 g of 12.8 wt % aqueous sodium hypochlorite were added dropwise thereto at an inner temperature of 80° C. and the reaction mixture was stirred to react at the same temperature for 4 hours. And then, the reaction mixture was cooled to an inner temperature of 30° C. or less. 60 wt % nitric acid was added thereto and a pH of the reacton mixture was adjusted to 5. Precipitated crystal was filtered and dried under reduced pressure to obtain 269.6 g of crystal. The obtained crystal was analyzed. As a result, Na: 17.0%, I: 46.4%, relative proportions of Na/I ratio=2.0, and the crystal was identified as disodium paraperiodate. The yield of disodium paraperiodate was found to be 98%.

Example 2

After adding 81.2 g of water to 20.6 g of sodium iodate, 10.3 g of 30 wt % aqueous sodium hydroxide and 64.7 g of 12.8 wt % aqueous sodium hypochlorite were added dropwise thereto at an inner temperature of 80° C. and the reaction mixture was stirred to react at the same temperature for 4 hours. And then, the reaction mixture was cooled to an inner temperature of 30° C. or less. As the pH of the reaction mixture was 3.9, 30 wt % aqueous sodium hydroxide was added the reaction mixture and the pH of the reaction mixture was adjusted to 5.3. Precipitated crystal was filtered and dried under reduced pressure to obtain 24 g of crystal. The obtained crystal was analyzed. As a result, Na: 16.1%, I: 47.4%, relative proportions of Na/I=1.9, and the crystal was identified as disodium paraperiodate. The yield of disodium paraperiodate was found to be 85%.

Example 3

After adding 80 g of water to 20 g of sodium iodate, 12.6 g of 30 wt % aqueous sodium hydroxide and 64.6 g of 12.8 wt % aqueous sodium hypochlorite were added dropwise thereto at an inner temperature of 80° C. and the reaction mixture was stirred to react at the same temperature for 4 hours. And then, the reaction mixture was cooled to an inner temperature of 30° C. or less. As the pH of the reaction mixture was 6.9, precipitated crystal was filtered as it is, and dried under reduced pressure to obtain 26.9 g of crystal. The obtained crystal was analyzed. As a result, Na: 17.0%, I: 46.3%, rerative proportions of Na/I=2.0, and the crystal was Identified as disodium paraperiodate. The yield of disodium paraperiodate was found to be 98%.

Example 4

After adding 80 g of water to 20.1 g of sodium iodate, 14.7 g of 30 wt % aqueous sodium hydroxide and 64.5 g of 12.8 wt % aqueous sodium hypochlorite were added dropwise thereto at an inner temperature of 80° C. and the reaction mixture was stirred to react at the same temperature for 4 hours. And then, the reaction mixture was cooled to an inner temperature of 30° C. or less. As the pH of the reaction mixture was 11.7, 60 wt % nitric acid was added the reaction mixture and the pH of the reaction mixture was adjusted to 8.7. Precipitated crystal was filtered and dried under reduced pressure to obtain 27 g of crystal. The obtained crystal was analyzed. As a result, Na: 16.7%, I: 47.7%, relative proportions of Na/I=1.9, and the crystal was identified as disodium paraperiodate. The yield of disodium paraperiodate was found to be 98%.

Comparative Example 1

After adding 200.5 g of water to 50 g of sodium iodate, 68.5 g of 30 wt % aqueous sodium hydroxide and 209.2 g of 12.8 wt % aqueous sodium hypochlorite were added dropwise thereto at an inner temperature of 80° C. and the reaction mixture was stirred to react at the same temperature for 4 hours. And then, the reaction mixture was cooled to an inner temperature of 30° C. or less. The pH of the reaction mixture was 13. Precipitated crystal was filtered as it is and dried under reduced pressure to obtain 73.5 g of crystal. The obtained crystal was analyzed. As a result, Na: 24.4%, I: 42.4%, relative proportions of Na/I=3.2, and the crystal was identified as not disodium paraperiodate but trisodium paraperiodate.

Reference Example 1

The solution in water containing sodium metaperiodate was prepared by mixing 44.4 g of disodium paraperiodate and 203 g of water and adding 17.2 g of 60 wt % nitric acid thereto at an inner temperature of 0° C. After adding 32.4 mg of ruthenium chloride (III) hydrate, 14.2 g of methyl trans-3,3-dimethyl-2-(2-methyl-1-propenyl)cyclopropanecarboxylate, 144 g of toluene and more 1.7 g of sodium metaperiodate to the solution at the same temperature, the reaction mixture was stirred to react for 25.5 hours. After completion of the reaction, residue sodium metaperiodate was reduced by adding 2.4 g of isopropyl alcohol to the reaction mixture. And then the reaction mixture was neutralized by adding 20 wt % aqueous sodium carbonate. After adding 0.2 g active carbon thereto and stirring about 30 minutes at an inner temperature 70° C., the reaction mixture was filtered at the same temperature. After the fitrate was standed, it was separated to obtain organic layer containing methyl trans-3,3-dimethyl-2-formylcyclopropanecabxylate and aqueous layer containing by-product sodium iodate. The above-mentioned aqueous layer was concentrated under the reduced pressure to remove the hydrophilic organic compounds such as acetone or the like from it and then the waste water containing by-product sodium iodate was obtained. In addition, the above-mentioned waste water also included the ruthenium catalyst used in the above reaction.

Example 5

To the waste water containing by-product sodium iodate obtained 28.7 g of 30 wt % aqueous sodium hydroxide and 109.8 g of 12.8 wt % aqueous sodium hypochlorite were added dropwise at an inner temperature 80° C., and the reaction mixture was stirred to react at the same temperature for 4 hours. And then, the reaction mixture was cooled to an inner temperature of 30° C. or less. 60 wt % nitric acid was added the reaction mixture and the pH of the reaction mixture was adjusted to 6. Precipitated crystal was filtered and dried under reduced pressure to obtain 45.7 g of crystal. The obtained crystal was analyzed. As a result, Na: 17.4%, I: 46.2%, relative proportions of Na/I=2.1, and the crystal was identified as disodium paraperiodate. The yield of disodium paraperiodate was found to be 98%.

Example 6

44.4 g of disodium paraperiodate obtained in the same manner as that of Example 1 and 203 g of water were mixed, and 17.2 g of 60 wt % nitic acid was added thereto at an inner temperature of 0° C. to form an aqueous solution including sodium metaperiodate.

What is claimed is:

1. A method for preparing disodium paraperiodate, characterized in that a pH of a reaction mixture which is obtained by reacting sodium iodate, iodic acid or a mixture thereof with sodium hypochlorite in the presence of sodium hydroxide is adjusted to the range between 5 and 10.

2. The method according to claim 1, which is characterized in that sodium iodate, iodic acid or a mixture thereof is reacted with sodium hypochlorite in the presence of sodium hydroxide to obtain a reaction mixture, and then the pH of the reaction mixture is adjusted to the range between 5 and less than 7.

3. The method according to claim 1, wherein the pH of the reaction mixture is adjusted to the range between 5 and less than 7.

4. The method according to claim 1, wherein the amount used of sodium hypochlorite is 1 mol to 3 mols per 1 mol of iodide ion in the sodium iodate, iodic acid or a mixture thereof, and the amount used of sodium hydroxide is 0.5 mol or more per 1 mol of sodium iodate and 1.5 mol or more per 1 mol of iodic acid.

5. The method according to claim 4, wherein the amount used of sodium hydroxide is 0.8 mol or more per 1 mol of sodium iodate, and 1.8 mols or more per 1 mol of iodic acid.

6. The method according to claim 4 or 5, wherein the amount used of sodium hydroxide is 3 mol or less per 1 mol of sodium iodate, iodic acid or the sum of them.

7. The method according to claim 6, wherein the amount of sodium hydroxide is 1 mol or more per 1 mol of sodium iodate, and 2 mols or more per 1 mol of iodic acid.

8. The method for preparing according to claim 1, wherein the sodium iodate, iodic acid or a mixture thereof is the sodium iodate, periodic acid or a mixture thereof obtained by reacting sodium metaperiodate, periodic acid or a mixture thereof as oxidant with organic compounds.

9. A method for producing sodium metaperiodate comprising
reacting sodium iodate, iodic acid or a mixture thereof with sodium hypochlorite in the presence of sodium hydroxide to obtain a reaction mixture and adjusting the pH of the reaction mixture to the range between 5 and 10 to form disodium paraperiodate, and
contacting the disodium paraperiodate with an acid to adjust the pH of the resulting mixture to the range between 2 and 2.5.

10. The method according to claim 9, wherein pH of the reaction mixture is adjusted to the range between 5 and less than 7 to form disodium paraperiodate.

* * * * *